Patented Aug. 16, 1949

2,479,241

UNITED STATES PATENT OFFICE 2,479,241

PROCESS FOR EMULSIFYING POLYMERIZABLE COMPOUNDS AND EFFECTING POLYMERIZATION WITH SAID EMULSIONS

Egbert Cornelis Hendrik Kolvoort and Gerrit Akkerman, Amsterdam, Netherlands, assignors to Shell Development Company, San Francisco, Calif., a corporation of Delaware No Drawing. Application July 29, 1947, Serial No. 764,582. In the Netherlands August 12, 1946

20 Claims. (Cl. 260—87.7)

This invention relates to an improved process for emulsifying polymerizable compounds such as vinyl chloride, for example, and effecting polymerization of the compounds with said emulsion.

Polymerization in aqueous emulsion has been recognized as a particularly advantageous method for some time. It has been customary in preparing the aqueous emulsion of a polymerizable compound to add the compound to water containing the desired amount of emulsifier and then vigorously agitating the mixture so as to form an emulsion wherein water constitutes the continuous phase. Peroxide catalysts have been added either before the emulsification operation or afterwards, and, in some cases, other substances have been added for the purpose of obtaining a desired pH value for the emulsion. Such emulsions are subject to certain serious disadvantages, the principal one of which is poor stability. The lack of stability is especially true with emulsions having a pH of less than 5, which acidic emulsions are especially desirable when hydrogen peroxide is employed as catalyst. The lack of stability has necessitated the use of mechanical stirrers and the like in order to maintain the emulsion in a state of vigorous agitation both before and during polymerization. Various means and formulas have been used to obtain emulsions of greater stability, but these have met with little success.

We have now discovered that by preparing the emulsions in a new manner from that heretofore employed, the resulting emulsion has markedly greater stability. According to our invention the emulsions are prepared by mixing only a small amount of a fairly concentrated aqueous solution of emulsifier with the polymerizable monomer so that a jelly-like mass is obtained. Water is then mixed with the jelly under vigorous agitation so as to dilute the mixture to the monomer concentration desired for polymerization. By this second addition of water the jelly is changed into a thin emulsion in which water constitutes the continuous phase.

The emulsions prepared according to this method have the monomeric polymerizable compound in a more finely dispersed state than monomer emulsions prepared in the hitherto usual manner. The marked superiority in stability of the new emulsions is, however, their outstanding attribute. They exhibit practically no tendency to break and settle out the monomer therein after several days of storage in contrast with prior emulsions which, although prepared with the same ingredients, were so unstable as to require continuous agitation. The stable emulsions of the present invention enable polymerization to be effected in reactors which employ no stirrers or other agitating devices. The previous unstable emulsions necessitate the use of such stirrers, and many times the stirring caused serious disturbances in the polymerization system owing to the fact that the stirring results in deposition of polymer on the surface of the reactors. Such polymer deposition which results from the use of stirring devices is avoided with the emulsions of the invention and stirrers may be disposed of entirely if desired or need be used only in a few places in order to effect reasonable agitation for dissipation of the heat of the polymerization reaction. The emulsions of the invention are particularly suitable for effecting polymerization in a tubular reactor which is particularly suitable for continuous operation in that emulsion may be continuously pumped in one end of the reactor and the resulting emulsion of polymer discharged continuously from the other end.

Our investigations with respect to the initially formed jelly-like mass of monomer and aqueous emulsifier solution has shown that the mass apparently consists of an intimate mixture of two continuous phases, one being the monomer phase and the other being the aqueous phase. The system assumes a jellied form by the presence of more or less rigid films at the interface of the monomer and the emulsifier solution.

The process of the invention may be applied to preparation of stable emulsions of any substantially water-insoluble polymerizable compound containing the

group. These compounds polymerize by addition involving carbon-to-carbon bonding through olefinic carbon atoms. Among representative compounds to which the invention may be applied are vinyl halides like vinyl chloride or bromide; vinyl esters such as vinyl acetate, propionate or butyrate; vinylidene chloride or bromide; vinyl aromatic compounds like styrene, methyl styrene, and chlorostyrene; acrylate and methacrylate esters like methyl, ethyl or butyl acrylate or methacrylate; unsaturated nitriles such as acrylonitrile and methacrylonatrile; vinyl ketones such as methyl vinyl or methyl isopropenyl ketone; allyl compounds such as allyl chloride as well as similar singly olefinic compounds. Also suitable are compounds which contain a plurality of olefinic linkages between aliphatic carbon atoms that are adapted to enable formation of addition polymers as is the case with butadiene-1,3, isoprene, 2,3-dimethyl butadiene-1,3, chloroprene, divinyl benzene, 2-methyl pentadiene-2,4, 2-methyl pentadiene-1,3, ethylene glycol dimethacrylate, diallyl phthalate, diallyl diglycolate, allyl vinyl phthalate, diallyl maleate, diallyl fumarate, diallyl ether of ethylene glycol, triallyl ether of glycerol, and similar compounds as well as their homologs. Copolymers can be prepared by use of mixtures of one or more of the polymerizable compounds, the mixture containing at least an appreciable proportion of any one of the compounds, i. e., at least 1% of a second, third or fourth compound. For example, vinyl chloride can be mixed with 5 to 25% of vinyl acetate, and, if desired, 1 to 5% of divinyl benzene can be present as third constituent.

The aqueous solution of emulsifier which is admixed with the monomer in order to obtain the jelly, contains an appreciable proportion of emulsifier. For this purpose the solution contains at least about 5% by weight, but preferably higher concentrations are used such as from about 10 to 35% by weight. The optimum concentration will vary to some extent as determined by the particular emulsifying agent and the nature of the other compounds dissolved in the water phase as well as the particular monomer being emulsified. Any of the various emulsifiers well known in the art are suitable for preparing the emulsion such as, for example, soaps like sodium or potassium myristate, laurate, palmitate, oleate, stearate, rosinate, or hydroabietate; or alkali metal alkyl or alkenyl sulfates or sulfonates, including sodium or potassium lauryl sulfate, cetyl sulfate, oleyl sulfonate, stearyl sulfonate, sulfonated Turkey red oil, sulfonated mineral oils, sodium alkyl naphthalene sulfonate, sodium arylalkyl polyether sulfonate, etc., as well as ammonium salts of such sulfates or sulfonates cetyl trimethyl ammonium bromide, cetyl pyridinium bromide sorbitol monolaurate, sorbitol mono-oleate, polyoxyalkylene ethers of partial esters of sorbitol with lauric palmitic, stearic or oleic acid. Particularly suited for the invention are the salts of alkyl sulfonates wherein the alkyl group contains about 10 to 20 carbon atoms. Such products are obtainable by known methods of subjecting paraffinic or cyclo paraffinic hydrocarbon mixtures which are substantially free from aromatic hydrocarbons to reaction with sulfur dioxide and chlorine and neutralizing the obtained sulfochloride with a base such as sodium or potassium hydroxide. Although any emulsifying agent is suitable for preparation of emulsions, proper choice is of course necessary when particular conditions of polymerization are desired. Thus, where the polymerization is effected with an acidic emulsion, it is necessary that the emulsifying agent be one which is stable in the presence of acid such as is the case with the salts of alkyl sulfonates.

In forming the jelly, the monomer is mixed with an appreciable proportion of the aqueous solution of emulsifier, but the proportions are such that the monomer predominates in the resulting mixture. Generally about 5 to 20% of the solution of emulsifier based on the weight of monomer is employed.

The dilution of the jelly or gelatinous mass requires, for best results, an arrangement whereby dilution is effected regularly with substantially uniform addition of the diluting water to the agitated mass. The addition of water to the mixture so that local excesses occur are undesirable since it has been found that at times lumps of the jelly tend to remain in the aqueous phase rather than a uniformly dispersed emulsion being obtained. The addition of the water may be effected in any suitable manner whereby vigorous agitation of the mass is obtained such as with the aid of a centrifugal pump or turbomixer. In those cases where it is desired that the dilution be carried out in continuous manner, it has been found that injection of the water from jet or jets, preferably counter-current to the stream, is suitable. The care in having uniformity of dilution of the jelly need only be continued until the water has become the continuous phase and the monomer assumes a distinct dispersed phase in the emulsion. After this extent of dilution has occurred, addition of further water may be made without observing special precautions for uniformity. In the most preferable embodiment of the invention the dilution is effected uniformly with vigorous agitation until the system contains a continuous aqueous phase and a dispersed monomer phase after which further dilution is effected by simple admixture of the water needed to give the desired monomer concentration.

The resulting extremely finely dispersed monomer emulsions may be used for polymerization carried out in the usual batchwise manner well known in the art. However, owing to their exceptional stability they are particularly well suited for use in effecting polymerization in a continuous manner.

The preparation of the jellied mixtures of the invention, as well as formation of the emulsions therefrom, is effected without heating. Accordingly, any reasonable normal temperature is suitable such as from about 10° C. to 30° C. In those cases where volatile monomers are used it will be necessary to apply superatmospheric pressures in order to maintain the monomer in liquid phase, as is the case, for example, with vinyl chloride.

Polymerization of the monomer in the aqueous emulsion is effected by adding thereto a peroxy compound as catalyst and otherwise subjecting the emulsion to polymerizing conditions. Thus, there may be added about 0.1 to 5% of peroxy compound and heating the emulsion at about 20 to 90° C. for a time sufficient to effect appreciable polymerization, e. g., 20% and upwards. The peroxy compound employed as catalyst is preferably water-soluble as is the case with hydrogen peroxide; sodium or potassium persulfate, percarbonate or perborate; peracetic acid; or para-tertiary butyl hydroperoxide, although other catalysts can be used such as benzoyl peroxide, acetyl peroxide, acetyl benzoyl peroxide, lauryl peroxide, acetone peroxide, etc. Substances capable of taking up molecular oxygen may also be present. The polymer obtained from the polymerization operation is removed from its dispersed state by coagulation with salts or addition of lower alcohols or acetic acid in the usual manner, or by any other suitable method. The polymerizing conditions are maintained for a time sufficient to effect appreciable polymerization of the monomer, i. e. until 25% and upwards has been converted to polymer. A time of 1 to 30 hours as a rule will achieve the result desired. Depending upon the particular conditions of temperature, catalyst, monomer, etc., the emulsions of the invention readily give polymer yields of 80 to 90%, or even higher. Furthermore, the undesired clots of polymer on the walls of the reactor are substantially absent with the emulsions prepared by the new method.

The following examples are given for the purpose of illustrating the best mode of applying the principle of the invention.

*Example I*

The unusual stability of the aqueous emulsion prepared by the method of the present invention as compared to that of the corresponding emulsion prepared by prior methods will be evident from the results obtained in the following experiments. The emulsifying agent used was a mixture of sodium alkyl sulfonates consisting to about 65% of monosulfonates and to about 35% of disulfonates and obtained by sulfochlorination of a mixture of saturated hydrocarbons, the constituents of which contain about 12 to about 18 C-atoms, the average number of C-atoms being about 15, followed by saponification of the resulting sulfochlorides with sodium hydroxide.

The emulsions were prepared in an emulsifying apparatus consisting of a cylindrical vessel of about 250 cc. capacity fitted with three pairs of propeller blades rotating on a common shaft. Three ring shaped baffles attached to the inner wall of the vessel were present between the propeller blades which were rotated at about 1300 R. P. M.

The stability of the emulsions was determined by measuring the specific gravity of the top and bottom after the emulsions had stood a fixed time. The polymerizable compound was vinylidene chloride which has an appreciably different specific gravity (1.21) from water so that it settles from the aqueous emulsifier solution when the emulsion lacks stability. Fifty cubic centimeters of emulsion were placed in a Mohr burette and allowed to stand stoppered therein at room temperature (about 20° C.) for 24 hours after which 10 cc. of the contents were withdrawn into a pycnometer. The middle portion in the burette was withdrawn and discarded, and the top 10 cc. were also run into a pycnometer. The specific gravities at $d_{25}^{25}$ were then determined for the top and bottom layers. Substantially the same values for the two specific gravities show that the emulsion has excellent stability while marked difference between the specific gravities demonstrates that the emulsion lacks stability.

The following amounts of ingredients were used to prepare emulsions by the invention method and by the old method:

1. 120 g. or 96 cc. of vinylidene chloride
2. 20.58 g. or 18.76 cc. of 25% by weight aqueous solution of the emulsifying agent
3. 159 cc. of water Using the method of the invention, the emulsion was prepared by introducing the vinylidene chloride and emulsifier solution into the emulsifying apparatus without stirring, then stirring for 5 minutes to form the jelly, followed by adding the water with stirring for an additional 3 minutes.

Using the old method, the emulsion was prepared by introducing the vinylidene chloride, the emulsifier solution, and the water into the emulsifying apparatus, and then stirring for 8 minutes.

The stability of the respective emulsions was determined by the above-described procedure with the following results:

| | Material | Sp. Gr. | Difference between Top and Bottom Layers |
|---|---|---|---|
| Invention Method | Original | 1.0775 | |
| | Top layer | 1.076 | |
| | Bottom layer | 1.079 | 0.003 |
| Old Method | Original | 1.077 | |
| | Top layer | 1.034 | |
| | Bottom layer | 1.211 | 0.177 |

The foregoing results clearly demonstrate the exceptional stability of the emulsion prepared by the method of the invention in comparison to the emulsion containing the same ingredients and proportions, but prepared by the old method known heretofore.

*Example II*

About 17 cc. of an aqueous solution containing about 25% by weight of the emulsifier described in Example I were mixed while stirring at room temperature with 100 g. of vinylidene chloride whereby a jelly was formed.

To this jelly about 50 cc. of water were gradually added in a thin jet in the course of about 2 minutes, it being arranged for the water to be uniformly dispersed in the mixture which was also agitated by use of a rapid stirrer. The concentrated emulsion obtained was subsequently diluted with water acidified with hydrochloric acid until the total mass amounted to about 500 g. The emulsion thus obtained had a pH value of about 2.6. The monomeric vinylidene chloride therein was very finely dispersed and the emulsion was stable and showed no signs of settling monomer therefrom after 3 days' storage.

An emulsion prepared from the same quantities of ingredients, but which had the monomeric vinylidene chloride added to the total quantity of water, was unstable and unless it was continuously agitated, immediately started to settle monomer.

*Example III*

About 17 parts by volume of an aqueous solution containing 24% by weight of the sulfonate emulsifying agent described in Example I were mixed in the manner described in Example I with about 83 parts by volume of vinylidene chloride. The jelly thus obtained was then drawn off from the stirring apparatus and at the same time brought into contact with about 100 parts by volume of water which was injected into the jelly in countercurrent manner by means of an injector. The homogeneous emulsion which was obtained was then diluted with water acidified with hydrochloric acid until the concentration of vinylidene chloride amounted to about 20% by weight. The acidic aqueous emulsion of vinylidene chloride was very finely dispersed and found not to have settled out after several days' storage.

*Example IV*

An autoclave fitted with a stirrer was used as a continuous mixing device and the following substances were added thereto at a rate per hour of about 4 kg. of vinylidene chloride and 1.32 liters or 1.46 kg. of aqueous solution of the emulsifying agent described in Example I. The aqueous solution contained about 27% by weight of the emulsifying agent. The jelly obtained by thorough mixing was led to a centrifugal pump into which about 2 kg. of water per hour was centrally introduced. The concentrated emulsion thus obtained was diluted further on by use of a T connection with about 12.8 kg. of water per hour. The 20% vinylidene chloride emulsion thus obtained was finely dispersed and showed no signs of demixing or settling out after a week's storage.

*Example V*

A stable emulsion was also obtained with the process described in Example IV except that the mixture was diluted with water containing hydrochloric acid so that the final emulsion had a pH value of about 2.

*Example VI*

About 3.1 kg. of vinyl chloride and 1 kg. of aqueous solution containing 26% of the emulsifying agent described in Example I were pumped per hour simultaneously into an autoclave fitted with a stirrer. The jelly obtained by mixing was conducted to a tubular turbomixer. In this turbomixer the jelly was gradually diluted with 1.5 kg. of water per hour by pumping the water into the hollow shaft of the turbomixer which shaft was provided with spray holes ranged in line at several places. The concentrated emulsion thus obtained was diluted with 8.5 liters of water per hour introduced by means of a T connection and subsequently at a second T connection with 1.1 liters per hour of a 3% by weight solution of hydrogen peroxide and sufficient hydrochloric acid so that the resulting emulsion had a pH of about 2.6.

The emulsion thus obtained was passed through a polymerization reactor consisting of a series of connected tubes made from acid-resistant steel having a total length of 180 meters and a diameter of 2.5 centimeters. The contents of the reactor was about 90 liters. The reaction mixture was maintained at about 35° C. The polymerization reaction proceeded very regularly and a fine dispersion of polymer was obtained as product. After about 410 hours of operation the test was discontinued. No deposition of solid polymer in the polymerization apparatus was found.

*Example VII*

There was pumped simultaneously into an autoclave fitted with a stirrer during each hour a mixture consisting of about 2.2 kg. of vinyl chloride and 0.75 kg. of vinylidene chloride together with about 1 kg. of aqueous solution containing 26% by weight of the emulsifying agent described in Example I. From the jelly obtained by thorough stirring an emulsion was prepared in the same manner as described in Example VI.

The emulsion was passed through the tubular polymerization reactor described in Example VI with the exception that the temperature was maintained at about 38° C. The polymerization reaction proceeded very regularly and a fine dispersion of copolymer was obtained as product. After 280 hours the run was terminated. No deposits of solid copolymer were found in the apparatus.

We claim as our invention:

1. A process for production of polymer which comprises mixing a predominant proportion of monomer of a substantially water-insoluble polymerizable liquid compound containing the group

with an aqueous solution containing about 5 to 35% of an emulsifying agent thereby forming a jellied mixture, uniformly mixing with vigorous agitation sufficient water with said mixture that an aqueous emulsion of said monomer is formed wherein water constitutes the continuous phase, and subjecting the resulting aqueous emulsion to polymerizing conditions so that monomer therein is converted to polymer.

2. A process for production of polymer which comprises mixing monomeric liquid vinyl chloride with about 5 to 20% of an aqueous solution containing about 10 to 35% of an emulsifying agent thereby forming a jellied mixture, uniformly mixing with vigorous agitation sufficient water with said mixture so that an aqueous emulsion containing about 10 to 30% of monomeric vinyl chloride is formed, and heating the resulting aqueous emulsion at 30 to 80° C. in the presence of 0.1 to 5% of a peroxy polymerization catalyst based on the amount of vinyl chloride contained in the emulsion for a time sufficient to effect appreciable polymerization of the vinyl chloride.

3. A process for production of polymer which comprises mixing monomeric liquid vinylidene chloride with about 5 to 20% of an aqueous solution containing about 10 to 35% of an emulsifying agent thereby forming a jellied mixture, uniformly mixing with vigorous agitation sufficient water with said mixture so that an aqueous emulsion containing about 10 to 30% of monomeric vinylidene chloride is formed, and heating the resulting aqueous emulsion at 30 to 80° C. in the presence of 0.1 to 5% of a peroxy polymerization catalyst based on the amount of vinylidene chloride contained in the emulsion for a time sufficient to effect appreciable polymerization of the vinylidene chloride.

4. In a process for polymerizing a substantially water-insoluble polymerizable compound containing the group

in the form of an aqueous emulsion, the steps which comprise agitating a predominant proportion of liquid monomer of said compound with an aqueous solution containing about 5 to 35% of an emulsifying agent thereby forming a jellied mixture, and subsequently mixing uniformly with vigorous agitation sufficient water with said mixture that an aqueous emulsion of said monomer is formed wherein the water constitutes the continuous phase.

5. In a process for polymerizing a substantially water-insoluble polymerizable compound containing the group

in the form of an aqueous emulsion, the steps which comprise agitating a mixture of liquid monomer of said compound with about 5 to 20% of aqueous solution containing about 5 to 35% of a salt of alkyl sulfonate having 10 to 30 carbon atoms in the alkyl group thereby forming a jellied mixture, and subsequently mixing uniformly with vigorous agitation sufficient water with said mixture that the resulting mixture contains 10 to 30% of said monomer as an aqueous emulsion wherein water forms the continuous phase.

6. In a process for polymerizing an aqueous emulsion of vinyl chloride, the steps which comprise agitating liquid vinyl chloride with about 5 to 20% of an aqueous solution containing about 5 to 35% of an emulsifying agent thereby forming a jellied mixture, and subsequently mixing uniformly with vigorous agitation sufficient water with said mixture that an aqueous emulsion of vinyl chloride is obtained wherein water forms the continuous phase.

7. In a process for polymerizing an aqueous emulsion of vinylidene chloride, the steps which comprise agitating liquid vinylidene chloride with about 5 to 20% of an aqueous solution containing about 5 to 35% of an emulsifying agent thereby forming a jellied mixture, and subsequently mixing uniformly with vigorous agitation sufficient water with said mixture that an aqueous emulsion of vinylidene chloride is obtained wherein water forms the continuous phase.

8. In a process for copolymerizing an aqueous emulsion of copolymerizable compounds, the steps which comprise agitating a mixture containing a substantial proportion of each of liquid vinyl chloride and vinylidene chloride with about 5 to 20% of an aqueous solution containing about 5 to 35% of an emulsifying agent thereby forming a jellied mixture, and subsequently mixing uniformly with vigorous agitation sufficient water with said jellied mixture that an aqueous emulsion of said compounds is obtained wherein water constitutes the continuous phase.

9. In a process for polymerizing an aqueous emulsion of vinyl chloride, the steps which comprise mixing liquid vinyl chloride with 5 to 20% of an aqueous solution containing about 5 to 35% of an emulsifying agent, thereby forming a jellied mixture, and subsequently mixing uniformly with vigorous agitation sufficient water with said mixture so that an aqueous emulsion is formed containing 10 to 30% of vinyl chloride having water as the continuous phase.

10. In a process for polymerizing an aqueous emulsion of vinylidene chloride, the steps which comprise mixing liquid vinylidene chloride with 5 to 20% of an aqueous solution containing about 5 to 35% of an emulsifying agent, thereby forming a jellied mixture, and subsequently mixing uniformly with vigorous agitation sufficient water with said mixture so that an aqueous emulsion is formed containing 10 to 30% of vinylidene chloride having water as the continuous phase.

11. In a process for polymerizing an aqueous emulsion of vinyl chloride with vinylidene chloride, the steps which comprise agitating a mixture containing substantial proportions of each of liquid vinyl chloride and vinylidene chloride with 5 to 20% of an aqueous solution containing about 5 to 35% of an emulsifying agent, thereby forming a jellied mixture, and subsequently mixing uniformly with vigorous agitation sufficient water with said jellied mixture that an aqueous emulsion containing 10 to 30% of the mixture of vinyl chloride and vinylidene chloride is obtained wherein water is the continuous phase.

12. In a process for polymerizing monomer of a substantially water-insoluble polymerizable compound containing the group

in the form of an aqueous emulsion, the step which comprises mixing a predominant proportion of liquid monomer of said compound with an aqueous solution containing about 5 to 35% of an emulsifying agent so as to obtain a jellied mixture which subsequently has sufficient water mixed uniformly therewith under vigorous agitation so that an aqueous emulsion of the monomeric compound is formed containing water as the continuous phase.

13. The jellied mixture obtained by the process defined in claim 12.

14. In a process for polymerizing monomer of a substantially water-insoluble polymerizable compound containing the group

in the form of an aqueous emulsion, the step which comprises agitating liquid monomer of said compound with about 5 to 20% of an aqueous solution containing about 5 to 35% of the sodium salt of an alkyl sulfonate having 10 to 30 carbon atoms in the alkyl group, thereby forming a jellied mixture which subsequently has sufficient water mixed uniformly therewith under vigorous agitation so that an aqueous emulsion of the monomeric compound is formed containing water as the continuous phase.

15. The jellied mixture obtained by the process defined in claim 14.

16. In a process for polymerizing an aqueous emulsion of vinyl chloride, the step which comprises agitating liquid vinyl chloride with about 5 to 20% of an aqueous solution containing dissolved therein about 10 to 35% of a salt of an alkyl sulfonate having 10 to 30 carbon atoms in the alkyl group, thereby forming a jellied mixture.

17. The jellied mixture obtained by the process defined in claim 16.

18. In a process for polymerizing an aqueous emulsion of vinylidene chloride, the step which comprises agitating liquid vinylidene chloride with about 5 to 20% of an aqueous solution containing dissolved therein about 10 to 35% of an alkali metal salt of an alkyl sulfonate having 10 to 30 carbon atoms in the alkyl group, thereby forming a jellied mixture.

19. The jellied mixture obtained by the process defined in claim 18.

20. In a process for copolymerizing an aqueous emulsion of vinyl chloride and vinylidene chloride, the step which comprises agitating a mixture containing a substantial proportion of each of liquid vinyl chloride and vinylidene chloride with 5 to 20% of an aqueous solution having dissolved therein about 10 to 35% of the sodium salt of an alkyl sulfonate having 10 to 30 carbon atoms in the alkyl group thereof whereby a jellied mixture is obtained which subsequently has sufficient water mixed uniformly therewith under vigorous agitation so that an aqueous emulsion of the monomeric compound is formed containing water as the continuous phase.

EGBERT CORNELIS
HENDRIK KOLVOORT.
GERRIT AKKERMAN.

No references cited.